United States Patent

Anderson

(10) Patent No.: US 6,722,827 B1
(45) Date of Patent: Apr. 20, 2004

(54) TOOL CLAMPING DEVICE EMPLOYING GAS SPRING

(75) Inventor: Ken Anderson, Årsunda (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/937,380

(22) PCT Filed: Mar. 8, 2000

(86) PCT No.: PCT/SE00/00457

§ 371 (c)(1),
(2), (4) Date: Dec. 13, 2001

(87) PCT Pub. No.: WO00/59666

PCT Pub. Date: Oct. 12, 2000

(30) Foreign Application Priority Data

Mar. 23, 1999 (SE) .............................. 9901042

(51) Int. Cl.[7] ................................. B23C 5/26
(52) U.S. Cl. .................. 409/233; 409/136; 408/239 R
(58) Field of Search ................. 409/233, 135, 409/136, 232; 408/239 R, 240; 267/130, 119

(56) References Cited

U.S. PATENT DOCUMENTS

| 3,118,345 | A | * | 1/1964 | Bullard, III et al. ........ 409/233 |
| 4,863,324 | A | * | 9/1989 | Blessing .................... 409/233 |
| 4,986,704 | A | | 1/1991 | Narushima et al. |
| 5,052,436 | A | * | 10/1991 | Bauch et al. ................ 137/580 |
| 5,327,979 | A | * | 7/1994 | Du et al. .................... 409/233 |
| 5,707,186 | A | * | 1/1998 | Gobell et al. ............... 409/233 |
| 5,865,578 | A | | 2/1999 | Benedikter et al. |
| 2002/0149140 | A1 | * | 10/2002 | Kitaura ....................... 267/130 |

FOREIGN PATENT DOCUMENTS

| DE | 34 23 060 | | 2/1986 |
| DE | 3824580 A1 | * | 1/1990 |
| DE | 3824581 A1 | * | 1/1990 |
| DE | 4339439 A1 | * | 3/1995 |
| JP | 2000-5907 A | * | 1/2000 |
| JP | 2001-87910 A | * | 4/2001 |
| JP | 2001-246507 A | * | 9/2001 |
| JP | 2001-248676 A | * | 9/2001 |

OTHER PUBLICATIONS

Marks' Standard Handbook for Mechanical Engineers, 9th ed., McGraw–Hill, 1987, pp. 3–34 through 3–35.*

* cited by examiner

Primary Examiner—Erica Cadugan
(74) Attorney, Agent, or Firm—Burns, Doane, Swecker & Mathis, LLP

(57) ABSTRACT

A tool part is held by a clamping mechanism which includes an axially-movable drawbar operably connected to a clamping unit for moving the clamping unit into and out of clamping relationship with the tool part. The drawbar is biased by a spring in the form of compressible gaseous medium for moving the clamping unit into clamping relationship with the tool part.

4 Claims, 2 Drawing Sheets

TOOL CLAMPING DEVICE EMPLOYING GAS SPRING

TECHNICAL FIELD OF THE INVENTION

This invention relates to a tool clamping device for a machine spindle, where said tool clamping device includes a drawbar, at one end of the drawbar a clamping organ is arranged in order to clamp part of a tool coupling at said end, plus a device to exert an axially directed force on the drawbar in a direction away from the clamping device, where the device which is to exert a force on the drawbar includes a housing, a piston which can be displaced axially in the housing plus a compressible pressure medium in the housing. The invention also relates to a machine spindle.

STATE OF THE ART OF THE TECHNOLOGY

Reference is made to the attached FIG. 1A and the associated descriptive section below for a more detailed explanation of the prior art.

OBJECTS AND FEATURES OF THE INVENTION

A primary object of the present invention is to present a tool clamping device for a machine spindle which is completely symmetrical and thereby to a large degree free from vibration.

A further object of the present invention is to present a tool clamping device which is capable of withstanding more clamping cycles than the prior art.

An additional object of the present-invention is to reduce the axial length of the tool clamping device, more exactly to reduce the length by approximately 50%.

A further object of the present invention is that the tool clamping device should be easier to assemble in the casing of the machine spindle.

The objects of this invention have been achieved through a tool-clamping device, which comprises a drawbar that is moveable in an axial direction, and a clamping unit operably connected to a first axial end of the drawbar and arranged to be displaced to clamping and non-clamping positions in response to axial movement of the drawbar in clamping and non-clamping directions, respectively. A force-exerting unit is provided for exerting an axial force on the drawbar in the clamping direction. The force-exerting unit includes a housing, a piston disposed in the housing and connected to the drawbar adjacent a second axial end thereof, and a compressible gaseous pressure medium in the housing for biasing the piston in a direction for moving the drawbar in the clamping direction.

The invention also pertains to a machine spindle which includes a casing in which the clamping device is disposed, as well as a push rod for axially displacing the drawbar.

BRIEF DESCRIPTION OF THE INVENTION

Figure 1:
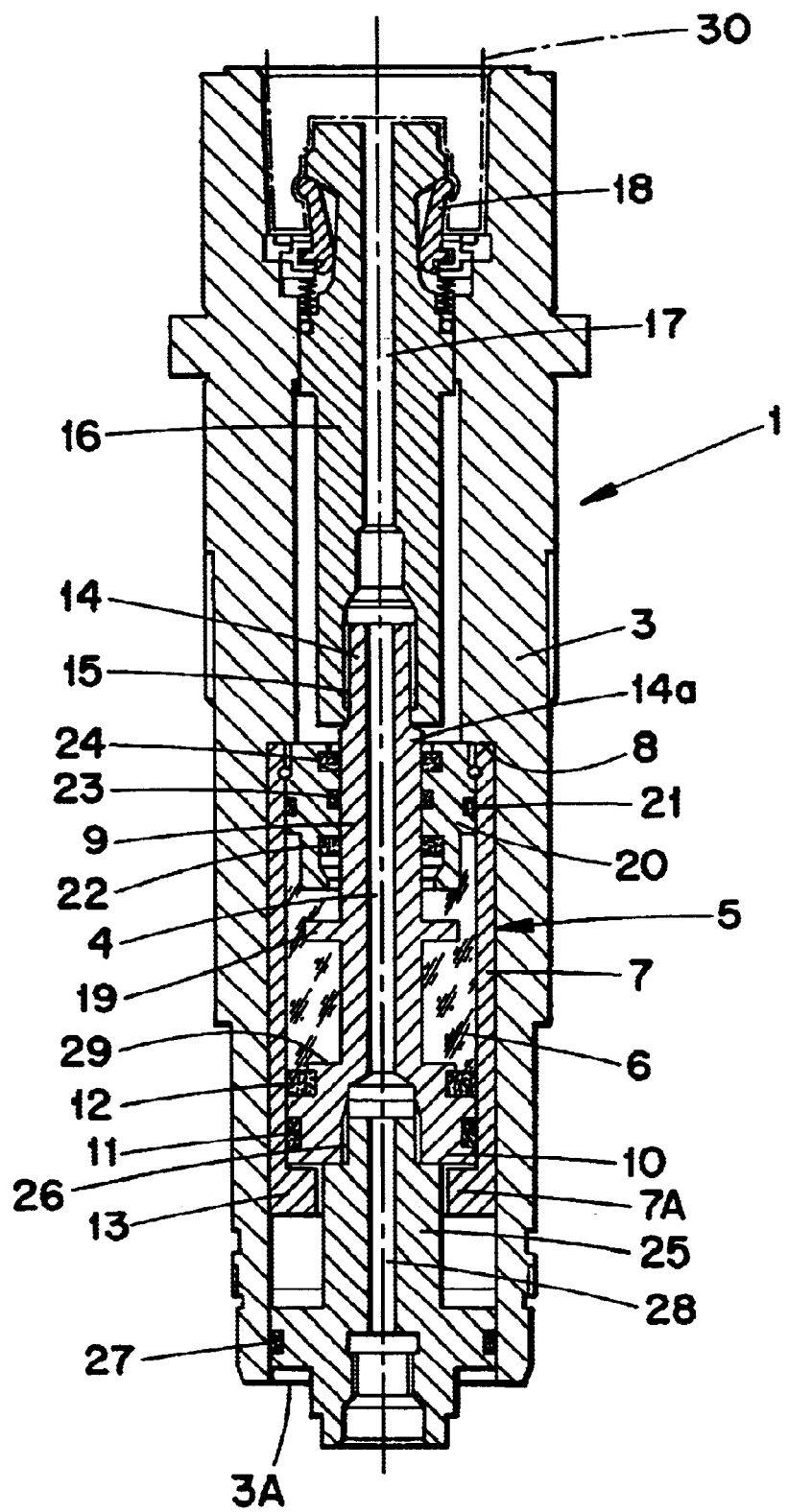
Figure 1A:
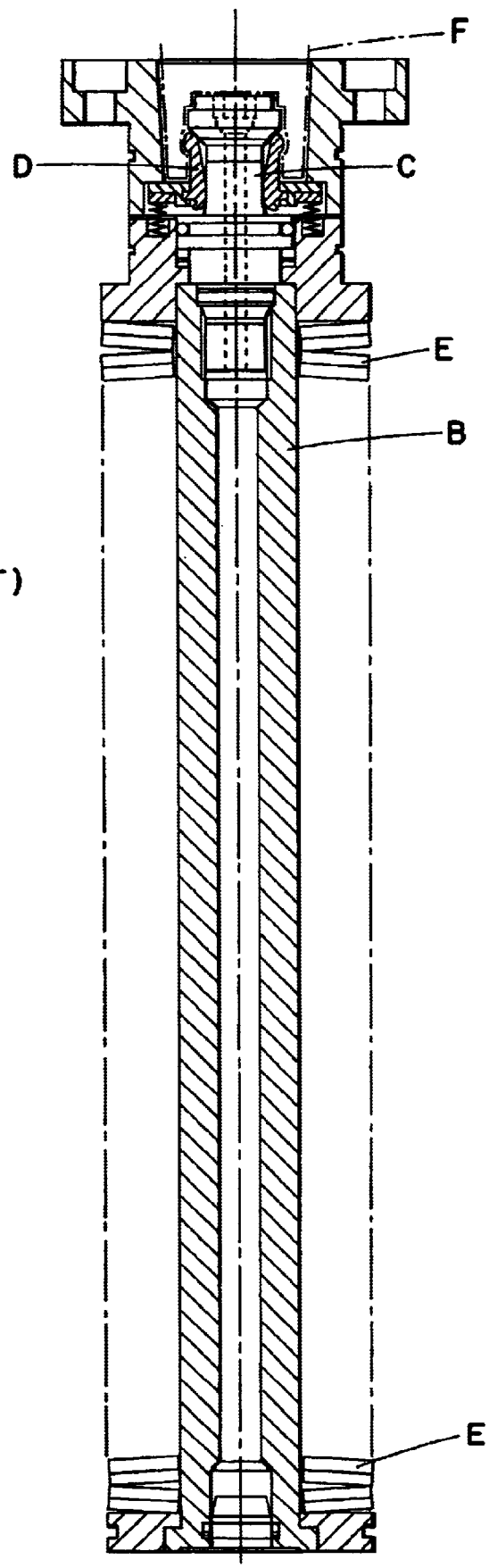

In the following, an embodiment of the invention is described with reference to the attached drawings wherein FIG. 1A shows a longitudinal section through a machine spindle with a tool clamping device according to prior art; and FIG. 1 shows a longitudinal section through a machine spindle in which a tool clamping device according to this invention is assembled.

DETAILED DESCRIPTION OF THE PRIOR ART AND PREFERRED EMBODIMENT OF THE INVENTION

Prior Art

Known machine spindles commonly include a tool-clamping device of the type, shown in the attached FIG. 1A. The said tool clamping device includes a drawbar B, which has a first end connected to a clamping bar C which is part of a tool clamping device. In its operative position the clamping bar is in engagement with a part F of a tool coupling, for example of the Coromant Capto® or ISO-cone type. The said clamping bar C features pivotable, secured segments D, the free ends of which are displaced radially outwards when the clamping bar C takes up its operative position. The drawbar B is actuated by a group of individual disc springs E, as shown in FIG. 1A, or by a helical spring. The drawbar B is displaced to one of its end positions within the machine spindle when the discs (or helical spring) find themselves in the expanded state. When the drawbar B finds itself in said one end position the clamping bar C will be found in its operative position, that is to say it clamps a part F of the tool coupling which is attached to said clamping bar C. In order to release the said part F of a tool coupling the drawbar B is displaced, accompanied by axial compression of the disc springs E, in the direction towards the clamping bar C. At that point the free ends of the segments D will pivot inwards and the tool coupling part F can be removed.

A clear disadvantage with the clamping device described above is that the disc springs E exhibit a play in relationship to the drawbar B, that is to say they have a center hole which is larger than the diameter B of the drawbar. The same applies to the center hole of a helical disc spring. As a result, the said play will result in the spindle running out of true, which in turn will lead to vibration and the spindle being unbalanced, these problems being specially noticeable at high rotational speeds.

In order to generate sufficiently high clamping forces the spring must feature a large quantity of discs (or turns, if a helical sprig is used). As a result of this, the spring in question, irrespective of whether it is a spring E or a helical disc spring, will have a considerable axial length, which in turn will lead to the length of the machine spindle similarly being of considerable length. This implies a disadvantage when handling, clamping and rotating the machine spindles.

A machine spindle of the type described above is capable of approximately 500,000 clamping cycles, whereby each cycle involves clamping and releasing of part of a tool coupling. This can appear to be a reassuring quantity but, in fact, a multiple increase in the number of clamping cycles, preferably four times, would be an exceptional advantage in this application.

Preferred Embodiment

The machine spindle shown in FIG. 1 includes a casing 3, inside which a clamping device according to this invention is assembled.

The clamping device, according to this invention, includes as a main component a "pulling" gas spring which is loosely attached to the inside of the casing 3. As can be seen from the upper part of FIG. 1 the gas spring 5, includes a cylindrical housing 7, which at its front (top) end in FIG. 1 lies against a stop 8, in the casing 3, which thus hinders the housing 7 from being displaced in an upwards direction according to FIG. 1. A displaceable piston 9 is provided inside the housing 7, which at its one end features a cylindrical end part 10, which lies in contact with the internal limiting end wall of the house 7 via seals 11 and 12, said seals running along the circumference of said cylindrical end part. In general the cylindrical end part 10, has a larger diameter than the front (upper) portion of the piston 9. At the rear (lower) end of the housing 7, which is positioned close to the end part 10, the housing 7 is provided with an abutment shoulder 13, which extends through 360° and inwards towards the center of the housing 7. The cylindrical end part 10 rests against the said shoulder when it is displaced as far downwards as is possible in FIG. 1. The purpose of the seals 11 and 12 is to seal the space between the cylindrical end part 10 and the internal limiting end wall of the housing from a gas medium, which is encased in the gas spring. The piston 9 features a first center through hole 4, for coolant.

The front free end 14 of the piston 9 lies on a connecting portion 14a of the piston which extends outwards through the housing 7. The said free end 14 is connected via a first threaded coupling to the drawbar 16, which features another central, through hole 17, for coolant, the purpose of which hole is to transport coolant from the under end of the drawbar 16 to its upper end in FIG. 1. The drawbar 16 is provided at its upper end in FIG. 1 with a clamping unit in the form of segments 18, said segments being held fast at one (lower) end and being pivotable towards the drawbar 16. The upper free ends of said segments are able to pivot radially outwards to an operating position when the drawbar is displaced downwards as shown in FIG. 1.

A radially outwards projecting flange 19, which extends all the way round the circumference is provided in a middle portion of the piston 9, whereby said flange acts as a stop when the piston 9 is displaced in a direction towards the upper end in FIG. 1 of the machine spindle. The said flange 19, will hence come into abutment against a gable element 20 of the gas spring 5, and more precisely against the under end of the said gable element 20.

As can be seen from FIG. 1 the gable element 20 is attached to the housing 7 of the gas spring 5 by a seal 21, which seals the cavity between the gable element 20, and the internal limiting wall of the housing 7, in relation to the gas medium 6, which is encased in the gas spring 5. The gable element 20 is provided with further seals 22, 23, 24, which seal the space in the cavity between the connecting portion 14a of the piston 9 and the gable element 20, in relation to the gas medium 6. Normally the pressure of the encased gas medium 6, is approximately 150 bar. According to a practice which is preferred at present the machine spindles 1 are delivered with the associated gas spring 5 in an "uncharged" condition, that is to say without the pressurized gas medium 6. The reason for this is that gas springs of the type in question may not, according to regulations at present in force, be transported by air transport if they contain gas which has a pressure of the order of 150 bar. The gas springs 5 are normally "charged" prior to delivery to a customer, and for this reason gas springs 5, are provided with a filling nipple (not shown) or something similar. The said nipple can obviously be used in situations where the gas medium is to be checked or maintained.

In the area of its lower free end, the cylindrical end part 10 features an internal thread which together with an external thread on a push rod 25, forms a second threaded joint 26. The said push rod 25 is displaceably positioned within the casing 3 of the machine spindle and is sealed against the inner limiting wall by a seal 27. The push rod 25 features a third, central, though channel for coolant 28. The function of said push rod 25 will be explained below. The casing 3 has a rear opening 3A, wherein the largest diameters of the push rod 25 and the housing 7 respectively, do not exceed the diameter of the rear opening 3A, as is evident from FIG. 1. The rear opening 7A of the housing has a diameter smaller than the maximum diameter of the cylindrical piston portion 10 as is also evident from FIG. 1.

The machine spindle 1, in FIG. 1, is shown in the situation where the piston 9 is displaced downwards to the maximum. At the same time the standing piston 9, under the pressure of the gas medium 6, has in turn displaced the drawbar 16 to the maximum downwards position. Also, the segments 18 have taken up their operative positions. That is to say, the free ends of the pivotable secured segments 18 have been displaced radially outwards to interlock with a part 30 of a tool coupling, for example of the COROMANT CAPTO® or ISO-cone type. Thus the encased gas medium 6, within the housing of the gas spring 5, exerts a pressure on an internal radial surface 29 of the cylindrical end part 10, which leads to the piston 9, and drawbar 16 being exposed to a permanent force acting in an axial direction which endeavors to displace this piston 9 downwards in FIG. 1. This said permanent, axially operating force ensures that the part F of the tool coupling is reliably secured to the free end of the drawbar 16.

When the part F of the tool coupling is to be released from the drawbar 16, the push rod 25 is displaced upwards in FIG. 1 in relation to the casing 3 of the machine spindle. The said displacement is achieved by allowing the push rod 25 to be influenced by some suitable external actuator, which is not illustrated. Hence the push rod 25 will displace the piston 9 in relation to both the housing 7 of gas spring 5, and the casing of the machine spindle. The said displacement of the piston 9 occurs in opposition to the influence of the gas medium 6 which is encased in the gas spring 5, which is thus compressible. The piston 9, which at its free end is connected to the drawbar 16, will thus displace the said drawbar upwards in FIG. 1, whereby the part F of the tool coupling can be released when the free ends of the segments 18 pivot radially inwards. When the force from the push rod ceases, that is to say when the push rod 25 is caused to revert to its position in accordance with FIG. 1, the spring 9, and even the drawbar 16, will revert to the position illustrated in FIG. 1 where the drawbar 16 is not linked to any part of a tool coupling. Obviously it is possible, and even most normal, that a new part of a tool coupling is attached to the free end of the drawbar 16 immediately after the part F of the tool coupling has been removed.

To summarize, therefore, it has been established that a gas spring which exerts an equivalent force to that of a disc spring or a helical spring has a considerably smaller axial length than said disc spring. Furthermore the gas spring does not include any loose elements which at high speeds of rotation can cause unbalance of the machine spindle and thereby subsequent vibration.

Possible Modifications of the Invention

In certain applications the clamping device on a machine spindle can be provided with a system of wedges which create a favourable conversion during the transfer of the forces acting on the drawbar to the clamping device on said drawbar 16. Thus this invention is not limited to only the embodiment of drawbar 16 shown in FIG. 1 but covers even clamping devices with different types of force conversion units and within the framework of the present invention are offered a number of different alternative ways for the person skilled in the art with regard to the transfer of forces from the drawbar 16, to the clamping device.

The examples of tool couplings described above are by no means thoroughly exhaustive, and clamping units on a drawbar 16 can be designed in several different ways in order to match different tools.

In the embodiment described above, a permanent force is brought to bear on the drawbar of a gas spring 5, in which a gas medium is encased. However one can, within the framework of the present invention, even think of other types of pressure medium which are encapsulated in the housing and which influence a piston which can be displaced axially. What must however apply in this respect is that the pressure medium is compressible in order to make possible the displacement of the push rod 25 upwards in FIG. 1.

What is claimed is:

1. Clamping mechanism on a machine spindle for clamping a tool coupling part, the clamping mechanism comprising:

a hollow casing defining a longitudinal axis extending in a front-to-rear direction, a rear end of the casing including a rear opening communicating with a chamber formed by the casing and a rearwardly facing stop surface disposed adjacent a front end of the chamber;

clamping segments disposed adjacent a front end of the casing for clamping a tool coupling part;

a clamp actuating assembly disposed within the casing and comprising:
      a housing, separate from the casing, disposed in the chamber rearwardly of the stop surface,
      wherein forward movement of the housing relative to the casing is limited by the stop surface, a largest diameter of the housing not exceeding a diameter of the rear opening of the casing,
      a gable mounted in the housing,
      a slidable structure disposed inside the casing and being slidable relative to both the housing and the casing along the axis, the slidable structure including:
         a front section disposed forwardly of the chamber and arranged to displace the clamping segments into clamping and non-clamping positions in response to axial movement of the slidable structure in clamping and non-clamping directions, respectively,
         a cylindrical piston portion disposed inside the housing and spaced rearwardly from the gable to define a space therebetween in which a compressible gaseous pressure medium is disposed for biasing the slidable structure in the clamping direction while pushing the gable forwardly against the stop surface, and
         a connecting portion extending forwardly from the cylindrical piston portion and passing through the gable;
      seals interposed between the gable and the connecting portion and between the gable and the housing; and
      a seal disposed on the cylindrical piston portion and engaging the housing.

2. The clamping mechanism according to claim 1 wherein the connecting portion is releasably attached to the front section of the slidable structure by a screw thread.

3. The clamping mechanism according to claim 1 wherein the housing includes a rear opening having a smaller diameter than a maximum diameter of the cylindrical piston portion.

4. The clamping mechanism according to claim 3 further comprising a push rod axially slidably disposed inside the chamber rearwardly of the housing and secured to a rear end of the cylindrical piston portion by a threaded connection.

* * * * *